US011762805B2

(12) United States Patent
Kamran et al.

(10) Patent No.: US 11,762,805 B2
(45) Date of Patent: Sep. 19, 2023

(54) LOGICAL PATHS FOR UNIFIED FILE AND BLOCK DATA STORAGE

(71) Applicant: EMC IP Holding Company LLC, Hopkinton, MA (US)

(72) Inventors: Lior Kamran, Richon LeZion (IL); Amitai Alkalay, Kadima (IL)

(73) Assignee: EMC IP Holding Company LLC, Hopkinton, MA (US)

(*) Notice: Subject to any disclaimer, the term of this patent is extended or adjusted under 35 U.S.C. 154(b) by 182 days.

(21) Appl. No.: 16/816,428

(22) Filed: Mar. 12, 2020

(65) Prior Publication Data
US 2021/0286757 A1  Sep. 16, 2021

(51) Int. Cl.
*G06F 16/11* (2019.01)
*G06F 16/182* (2019.01)

(52) U.S. Cl.
CPC .......... *G06F 16/11* (2019.01); *G06F 16/1824* (2019.01)

(58) Field of Classification Search
CPC .............................. G06F 16/11; G06F 16/1824
See application file for complete search history.

(56) References Cited

U.S. PATENT DOCUMENTS

| 7,526,558 B1 * | 4/2009 | Pittman ............... H04L 67/1097 |
| | | 709/227 |
| 9,305,009 B1 | 4/2016 | Bono et al. |
| 9,330,155 B1 | 5/2016 | Bono et al. |
| 9,378,219 B1 | 6/2016 | Bono et al. |
| 9,880,777 B1 | 1/2018 | Bono et al. |
| 9,881,014 B1 | 1/2018 | Bono et al. |
| 2018/0173721 A1 * | 6/2018 | Araki .................... G06F 3/0662 |
| 2020/0028894 A1 * | 1/2020 | Memon ................. H04L 67/148 |

* cited by examiner

*Primary Examiner* — Mark D Featherstone
*Assistant Examiner* — Samuel C Sharpless, III
(74) *Attorney, Agent, or Firm* — BainwoodHuang

(57) ABSTRACT

A file storage application that processes file operations is communicably connected with a block storage application that processes block operations by establishing multiple communication sessions between the file storage application and the block storage application. Multiple logical volumes provided by the block storage application are exposed to the file storage application over the multiple communication sessions established between the file storage application and the block storage application using a total number of logical paths to the logical volumes that is equivalent to the total number of the logical volumes provided by the block storage application to the file storage application.

18 Claims, 5 Drawing Sheets

LOGICAL PATHS FOR UNIFIED FILE AND BLOCK DATA STORAGE

TECHNICAL FIELD

The present disclosure relates generally to intelligent data storage systems that provide unified file and block data storage services, and more specifically to technology that uses a relatively small number of logical paths over multiple communication sessions to expose logical volumes of non-volatile data storage provided by a block storage application to a file storage application.

BACKGROUND

A distributed data storage system is an arrangement of hardware and software that includes multiple nodes, each of which may be coupled to and/or include non-volatile data storage drives, such as solid state drives and/or magnetic disk drives. The nodes in the storage system process data storage operations that are received from physical and/or virtual client machines ("clients"). In a distributed data storage system that provides both block-based and file-based data storage services (a "unified" data storage system), the data storage operations received from the clients and processed by the nodes of the data storage system include both block-level data storage operations ("block operations"), and file-level data storage operations ("file operations").

Block operations are directed to block data storage objects that are hosted by the data storage system, such as logical volumes of non-volatile data storage sometimes also referred to as "LUNS" (Logical UNits). Block operations processed by the data storage system enable clients to create logical volumes, read blocks of data from the logical volumes, write blocks of data to logical volumes, create snapshots of logical volumes, and/or perform other specific actions with regard to logical volumes of non-volatile data storage.

File operations are directed to files that are hosted by the data storage system. By processing file operations, one or more nodes of the data storage system may operate as a NAS (Network Attached Storage) server. Examples of file operations that may be processed by the data storage system include operations performed by clients on files hosted by the data storage system using NFS (Network File System), SMP (Server Message Block), or AFP (Apple Filing Protocol) file sharing protocols. File operations processed by the data storage system enable clients to create files, read files, write files, and/or perform other specific actions with regard to files hosted by the data storage system.

SUMMARY

A node in a distributed data storage system may include and execute a file storage application that processes file operations, and a block storage application that processes block operations. The file storage application may access non-volatile data storage of the data storage system through the block storage application, e.g. using logical volumes of non-volatile data storage that are provided to the file storage application by the block storage application. The logical volumes provided by the block storage application to the file storage application enable the file storage application to store files that are accessed by clients through the file storage application and other data into physical non-volatile data storage that is organized into logical volumes by the block storage application. In order for the file storage application to access the logical volumes of non-volatile data storage provided to the file storage application by the block storage application, the file storage application must establish at least one communication session with the block storage application, such as an iSCSI (Internet Small Computer Systems Interface) session between the file storage application and the block storage application. However, using only a single communication session to connect the file storage application with the block storage application may result in that communication session becoming a performance bottleneck, and prevent the file storage application from obtaining the highest possible performance when accessing the logical volumes that are provided to the file storage application by the block storage application. Accordingly, multiple communication sessions may advantageously be established between the file storage application and the block storage application in order to reduce this bottleneck and improve performance when the file storage application accesses logical volumes of non-volatile data storage provided by the block storage application.

Some previous data storage technologies have created a logical path to each one of the logical volumes provided to the file storage application within each communication session established between the file storage application and the block storage application. Such an approach may result in the creation of a total number of logical paths equal to the total number of communication sessions between the file storage application and the block storage application multiplied by the total number logical volumes provided to the file storage application. In the case where many logical volumes are provided to the file storage application (e.g. potentially thousands of logical volumes), the total number of logical paths created may become very large. At the same time, each one of the logical paths to the logical volumes is associated with its own block device by the operating system (e.g. in the Linux operating system). As a result of the creation of such large numbers of paths and associated block devices, unacceptably long delays may occur when certain standard operations are performed, e.g. by facilities such as the "udev" device manager and/or the "multipath" tool associated with the Linux operating system. For example, whenever a new logical volume is added or removed, and/or during HA (High Availability) events such as Node Failover when a node fails, the existence of a very large number of logical paths and associated block devices may greatly increase the amount of time required to complete session re-scan operation(s) that are performed under such circumstances. In some cases, this lengthy processing delay may result in an outstanding file operation queue of one or more clients becoming full, and potentially cause one or more client file operations to fail due to operation completion timer expiration. It is accordingly desirable to have technology that does not create such large numbers of logical paths to the logical volumes of non-volatile data storage that are provided to the file storage application by the block storage application.

In order to address the above described and other technical problems and/or shortcomings of previous technologies, technology is disclosed herein that connects a file storage application that processes file operations with a block storage application that processes block operations by establishing multiple communication sessions between the file storage application and the block storage application. The disclosed technology exposes multiple logical volumes of non-volatile data storage that are provided by the block storage application to the file storage application over the multiple communication sessions established between the file storage application and the block storage application using a total number of logical paths to those logical volumes that is equal to a total number of the logical volumes that are provided by the block storage application to the file storage application.

In some embodiments, the disclosed technology exposes the logical volumes to the file storage application at least in part by exposing a different subset of the logical volumes to the file storage application over each one of the communication sessions, and by exposing each individual logical volume to the file storage application through a single corresponding logical path.

In some embodiments, the disclosed technology balances the logical volumes across the multiple communication sessions between the file storage application and the block storage application such that the subsets of the logical volumes exposed to the file storage application over the communication sessions each contain an equal number of the logical volumes.

In some embodiments, the number of logical volumes contained in each subset of the logical volumes exposed to the file storage application over one of the communication sessions is equal to the total number of logical volumes provided by the block storage application to the file storage application divided by a total number of the communication sessions established between the file storage application and the block storage application.

In some embodiments, in response to detecting the creation of a new logical volume provided by the block storage application to the file storage application, the disclosed technology exposes the new logical volume to the file storage application over one of the communication sessions currently exposing a smallest subset of the logical volumes to the file storage application.

In some embodiments, the subsets of the logical volumes that are exposed to the file storage application over the communication sessions are balanced across the communication sessions by the block storage application.

In some embodiments, the subsets of the logical volumes that are exposed to the file storage application over the communication sessions are balanced across the communication sessions by the file storage application.

Embodiments of the disclosed technology may provide significant improvements over previous data storage technology. For example, relative to previous technologies, the disclosed technology may reduce the total number of logical paths that must be created. As a result, the number of block devices that must be defined by the operating system may also be reduced. Delays may accordingly be shortened relative to previous technologies when certain standard operations are performed, e.g. by facilities such as the "udev" device manager and/or the "multipath" tool associated with the Linux operating system. The amount of time required to complete session re-scan operation(s) may also be reduced, thus lessening the likelihood that an outstanding file operation queue of one or more clients becoming full, and/or that one or more client file operations may fail due to operation completion timer expiration.

BRIEF DESCRIPTION OF THE DRAWINGS

The foregoing and other objects, features and advantages of the disclosed technology will be apparent from the following description of embodiments, as illustrated in the accompanying drawings in which like reference characters refer to the same parts throughout the different views. The drawings are not necessarily to scale, emphasis instead being placed on illustrating the principles of various embodiments.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

The technology disclosed herein may improve over previous technologies by substantially reducing the number of logical paths that are created for logical volumes that are exposed over multiple communication paths established between a file storage application and a block storage application in one or more nodes of a unified distributed data storage system, e.g. within a distributed data storage system that provides both block and file data storage services to clients. The disclosed technology connects a file storage application that processes file operations with a block storage application that processes block operations through multiple communication sessions that are established between the file storage application and the block storage application. Multiple logical volumes are provided by the block storage application to the file storage application, and are exposed to the file storage application over the multiple communication sessions established between the file storage application and the block storage application, using a total number of logical paths to the logical volumes that is equal to a total number of the logical volumes provided by the block storage application to the file storage application, e.g. by exposing each logical volume to the file storage application using a single corresponding logical path. A different subset of the logical volumes is exposed to the file storage application over each one of the communication sessions. The logical volumes may be balanced across the multiple communication sessions between the file storage application and the block storage application such that equivalent sized subsets of the logical volumes are exposed to the file storage application over the individual communication sessions. The subsets of the logical volumes that are exposed to the file storage application over the communication sessions may be balanced across the communication sessions by the block storage application or by the file storage application.

Figure 1:
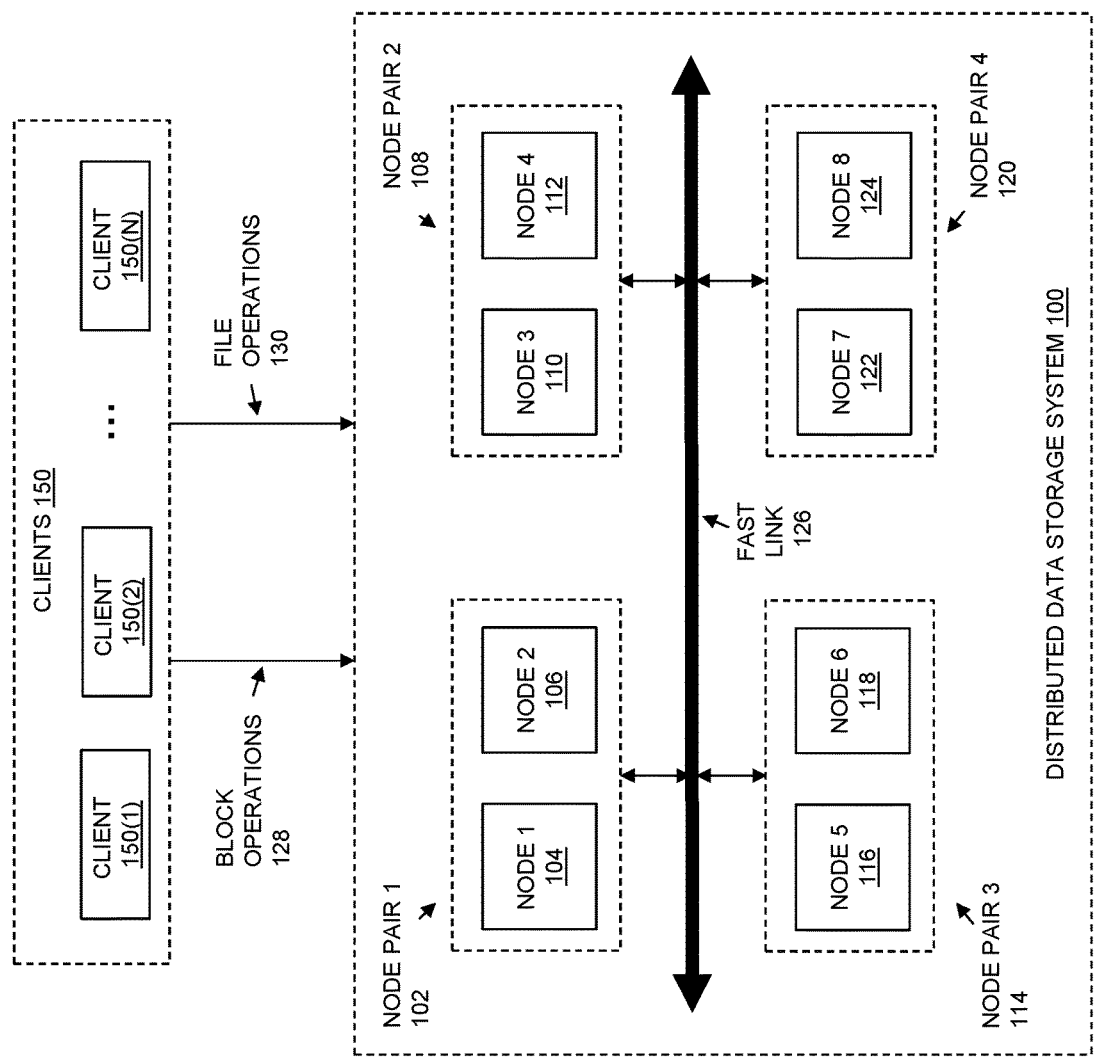
FIG. 1 is a block diagram showing an example of a distributed data storage system in which embodiments of the disclosed technology are embodied.

FIG. 1 is a block diagram showing an example of a Distributed Data Storage System 100 that includes multiple pairs of nodes, shown for purposes of illustration by Node Pair 1 102 that is made up of Node 1 104 and Node 2 106, Node Pair 2 108 that is made up of Node 3 110 and Node 4 112, Node Pair 3 114 that is made up of Node 5 116 and Node 6 118, and Node Pair 4 120 that is made up of Node 7 122 and Node 8 124. While the example Distributed Data Storage System 100 is shown including four node pairs, the disclosed technology is not limited to embodiments having any specific number of node pairs or individual nodes. Each pair of nodes may be configured to provide fault tolerance, such that a service or services provided at least in part by one or both nodes in a pair may be seamlessly continued in the event of a node failure.

The pairs of nodes in the Distributed Data Storage System 100 and/or the nodes within each node pair may be communicably connected using various specific network communication technologies. For example, one or more of the pairs of nodes and/or the nodes within each node pair may be communicably interconnected over Fast Link 126, e.g. using technology such as RDMA (Remote Direct Memory Access) over Ethernet or the like and network adapters contained in each node.

Each node in Distributed Data Storage System 100 may include and/or be coupled to one or more non-volatile data storage drives (e.g. solid state drives and/or magnetic disk drives). Each node in Distributed Data Storage System 100 may process data storage operations that are received by Distributed Data Storage System 100 over one or more communication networks from some number of physical and/or virtual client machines, shown in FIG. 1 by Clients 150. Clients 150 are shown including for purposes of illustration Client 150(1), Client 150(2), and so on through Client 150(N).

Distributed Data Storage System 100 may be a unified storage system, providing both block-based and file-based data storage services. For example, each node in Distributed Data Storage System 100 may include and execute a block storage application that processes Block Operations 128 received from Clients 150. Block Operations 128 are directed to block data storage objects that are hosted by one or more nodes of the data storage system, such as logical volumes of non-volatile data storage that are provided to Clients 150 by the block storage application. Block Operations 128 enable Clients 150 to create logical volumes, read blocks of data from logical volumes, write blocks of data to logical volumes, create snapshots of logical volumes, and/or perform other specific actions with regard to logical volumes.

In addition, each node in Distributed Data Storage System 100 may include and execute a file storage application that processes File Operations 130 received from Clients 150. The file storage application in each node may provide a NAS (Network Attached Storage) interface that is accessible by Clients 150. Examples of File Operations 130 that may be processed by the file storage application executing in each node include operations performed by Clients 150 on files hosted by Distributed Data Storage System 100, and File Operations 130 may be performed using NFS (Network File System), SMP (Server Message Block), or AFP (Apple Filing Protocol) file sharing protocols. File Operations 130 processed by the file storage application executing in each node of Data Storage System 100 enable Clients 150 to create files, read files, write files, and/or perform other specific actions with regard to files hosted by Data Storage System 100.

Figure 2:
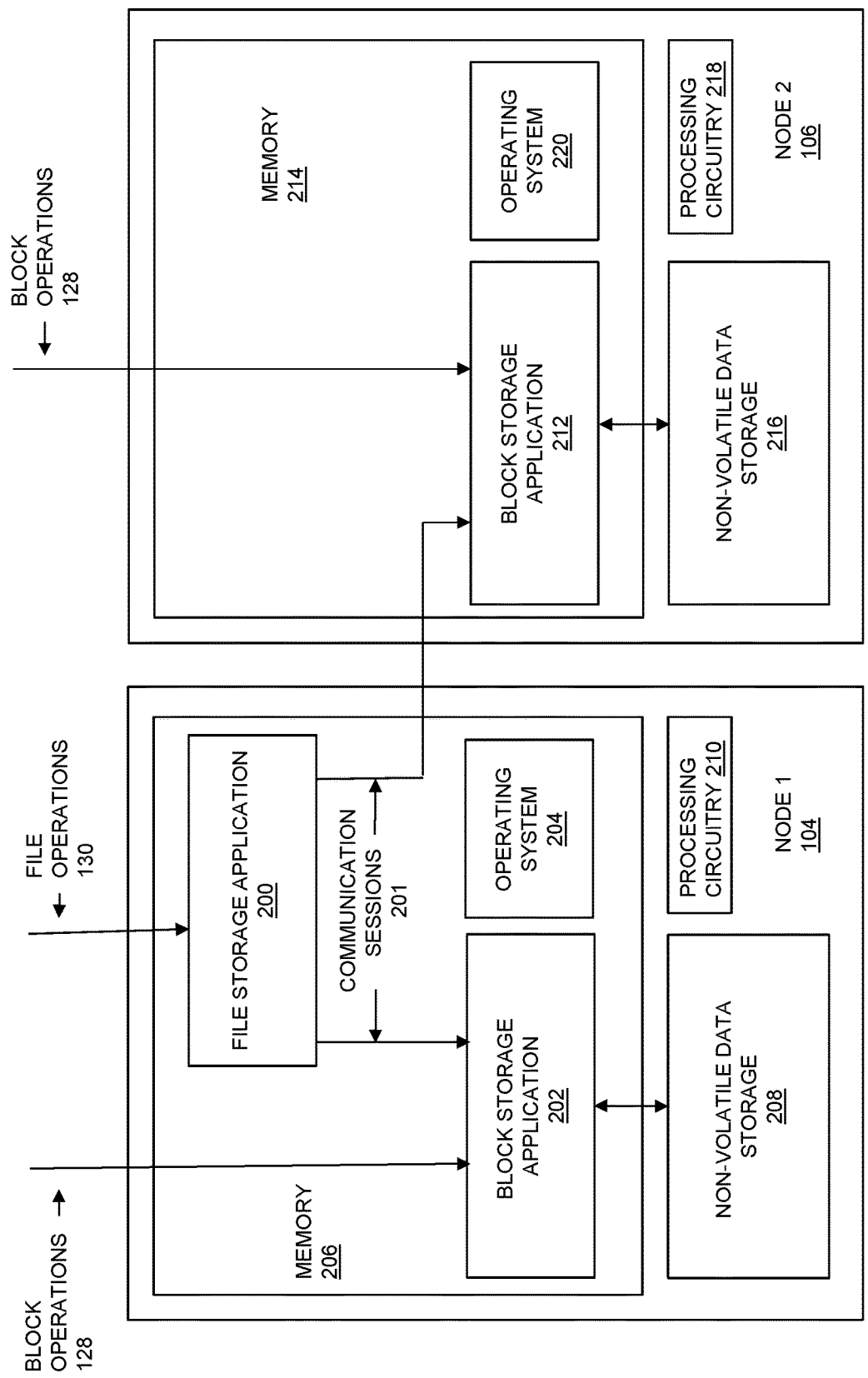
FIG. 2 is a block diagram showing an example of two nodes in the distributed data storage system of FIG. 1 in some embodiments.

FIG. 2 is a block diagram showing an example of two nodes in the Distributed Data Storage System 100, e.g. Node 1 104 and Node 2 106. As shown in FIG. 2, Node 1 104 and Node 2 106 may each include and/or be coupled to non-volatile data storage, e.g. Non-Volatile Data Storage 208 in Node 1 104, and Non-Volatile Data Storage 216 in Node 2 106. Non-Volatile Data Storage 208 and/or Non-Volatile Data Storage 216 may each include and/or consist of some number of physical non-volatile data storage drives (e.g. solid state drives and/or magnetic disk drives).

Node 1 104 and Node 2 106 may also each include processing circuitry, together with memory that stores program code that is executable on the processing circuitry. For example, Node 1 104 includes Processing Circuitry 210 and Memory 206, and Node 2 106 includes Processing Circuitry 218 and Memory 214. Processing Circuitry 210 and Processing Circuitry 218 may each include or consist of one or more microprocessors or the like. Memory 206 and Memory 214 may each include or consist of relatively high speed volatile memory, e.g. RAM (Random Access Memory) or the like. The processing circuitry and memory in each node together form control circuitry, which is configured and arranged to carry out various methods and functions as described herein. The memory of each node stores a variety of software components that may be provided in the form of executable program code (e.g. executable instructions). For example, Memory 206 may include software components such as File Storage Application 200, Block Storage Application 202, and Operating System 204 (e.g. Linux or the like). Memory 214 may include software components such as Block Storage Application 212 and Operating System 220 (e.g. Linux or the like). Memory 214 may also include a file storage application (not shown in FIG. 2). When program code in the memory of a node is executed by the processing circuitry of the node, the processing circuitry is caused to carry out the operations of the software components. Although certain software components are shown and described for purposes of illustration and explanation, those skilled in the art will recognize that the memory of each node may also include various other software components, and that each node and/or the distributed data storage system may provide services and/or functions other than those described herein.

As shown in FIG. 2, Block Storage Application 202 and/or Block Storage Application 212 process Block Operations 128, thus enabling Clients 150 to create, read, write, and generate snapshots of logical volumes that are provided to Clients 150. For example, Block Storage Application 202 and/or Block Storage Application 212 may provide logical volumes to Clients 150 that are allocated from Non-Volatile Data Storage 208 and/or Non-Volatile Data Storage 216.

File Storage Application 200 processes File Operations 130 that enable Clients 150 to create, read, and write files that are hosted by Distributed Data Storage System 100. File Storage Application 200 accesses non-volatile data storage of Distributed Data Storage System 100 through one or more of the block storage applications executing in the nodes of the Distributed Data Storage System 100, by using the block storage application to create logical volumes of non-volatile data storage that are provided to File Storage Application 200, and then accessing (i.e. writing and reading using block operations) the logical volumes of non-volatile data storage that are provided to File Storage Application 200 by the block storage application. For example, File Storage Application 200 may access Non-Volatile Data Storage 208 and/or Non-Volatile Data Storage 216 through Block Storage Application 202 and/or Block Storage Application 212 by creating and then using (e.g. accessing by writing and/or reading using block operations) one or more logical volumes that are allocated from Non-Volatile Data Storage 208 and/or Non-Volatile Data Storage 216 by Block Storage Application 202 and/or Block Storage Application 212, and that are provided to File Storage Application 200 by Block Storage Application 202 and/or Block Storage Application 212.

The logical volumes of non-volatile data storage provided by Block Storage Application 202 and/or Block Storage Application 212 to File Storage Application 200 are used by File Storage Application 200 to persistently store files that are accessed by Clients 150 (e.g. files that are accessed by clients through File Operations 130) into the physical non-volatile data storage of Distributed Data Storage System 100. In order for File Storage Application 200 to access the logical volumes of non-volatile data storage that are provided to File Storage Application 200 by Block Storage Application 202 and/or Block Storage Application 212, File Storage Application 200 establishes multiple communication sessions with Block Storage Application 202 and/or Block Storage Application 212, such as, for example, iSCSI (Internet Small Computer Systems Interface) sessions. Since using only a single iSCSI session between File Storage Application 200 and either Block Storage Application 202 or Block Storage Application 212 may result in that iSCSI session becoming a performance bottleneck, File Storage Application 200 establishes multiple iSCSI sessions with Block Storage Application 202 and/or with Block Storage Application 212. The multiple iSCSI sessions that connect File Storage Application 200 to Block Storage Application 202 and/or to Block Storage Application 212 are shown for purposes of illustration in FIG. 2 by Communication Sessions 201.

While in the example of FIG. 2, Communication Sessions 201 are shown having been established between File Storage Application 200 and Block Storage Application 202 and/or Block Storage Application 212, those skilled in the art will recognize that such communication sessions may alternatively or additionally be established between File Storage Application 200 and one or more other block storage applications executing on one or more other nodes in Distributed Data Storage System 100, in order for File Storage Application 200 to connect to those block storage applications in order to access logical volumes of non-volatile data storage allocated from non-volatile data storage devices of the Distributed Data Storage System 100 through those other block storage applications.

Figure 3:
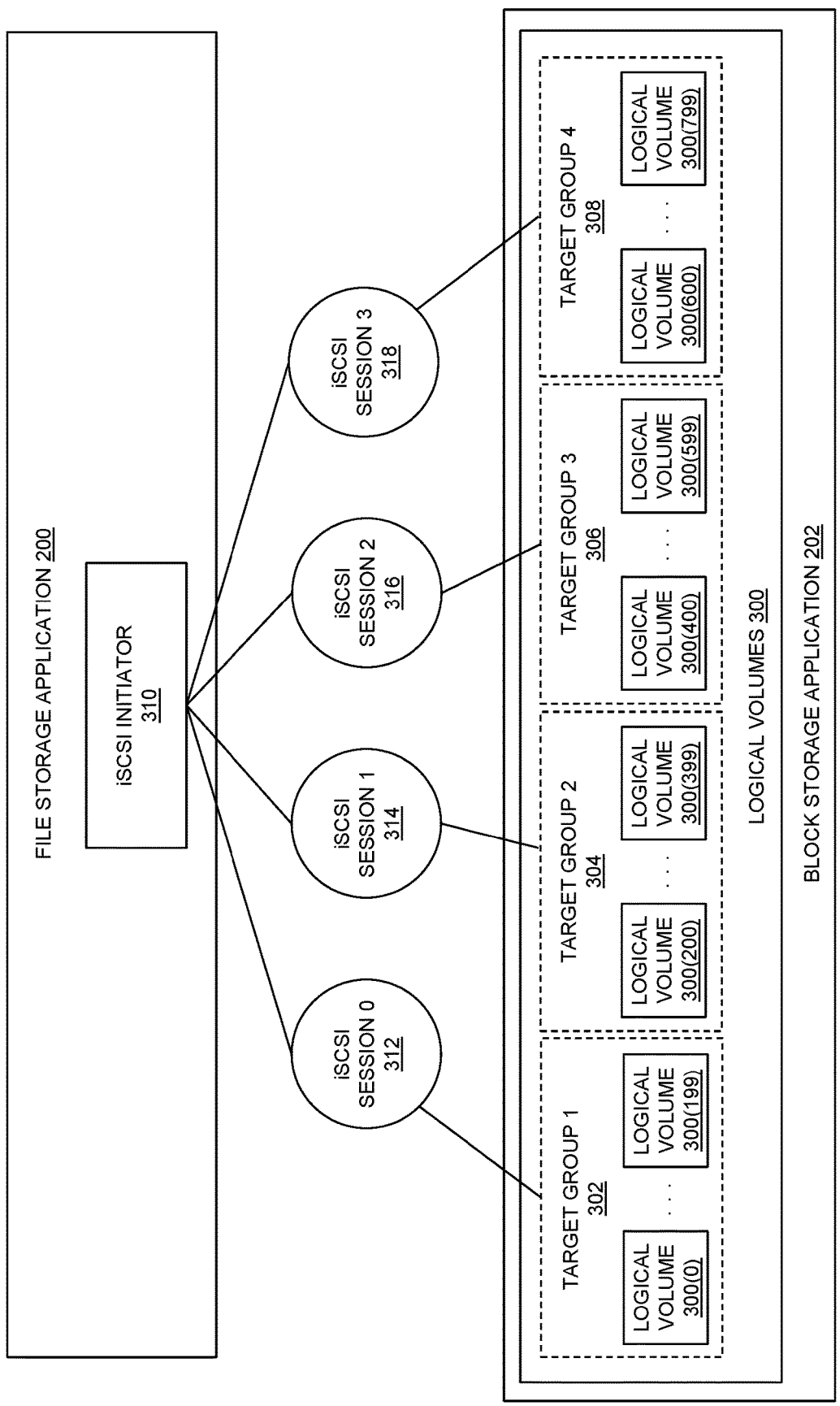
FIG. 3 is a block diagram illustrating an example of the operation of an embodiment of the disclosed technology that includes a block storage application that balances subsets of logical volumes that are exposed to the file storage application across multiple communication sessions established between the file storage application and the block storage application.

FIG. 3 is a block diagram illustrating an example of the operation of an embodiment of the disclosed technology in which Block Storage Application 202 balances subsets of the logical volumes that are exposed to File Storage Application 200 across multiple communication sessions that are established between File Storage Application 200 and the block storage application. In the example of operation shown in FIG. 3, File Storage Application 200 creates a single iSCSI initiator, shown by iSCSI Initiator 310, and a single iSCSI initiator group. iSCSI Initiator 310 connects File Storage Application 200 to Block Storage Application 202 by establishing multiple communication sessions between File Storage Application 200 and Block Storage Application 202, e.g. four iSCSI sessions shown by iSCSI Session 0 312, iSCSI Session 1 314, iSCSI 2 316, and iSCSI 3 318.

In the embodiment of the disclosed technology shown in FIG. 3, the features and improvements of the disclosed technology may be provided completely by the block storage application (e.g. by Block Storage Application 202). Accordingly, the embodiment of FIG. 3 may advantageously allow the features and improvements of the disclosed technology to be provided without requiring any modification to the file storage application (e.g. without any modification to File Storage Application 200).

In the example of operation shown in FIG. 3, Block Storage Application 202 provides eight hundred logical volumes to File Storage Application 200, as shown by Logical Volumes 300, which include Logical Volume 300(0) through Logical Volume 300(799). Logical Volumes 300 are exposed to File Storage Application 200 over the communication sessions established between File Storage Application 200 and Block Storage Application 202 using a total number of logical paths to Logical Volumes 300 that is equal to the total number of the logical volumes provided by Block Storage Application 200 to File Storage Application 200, e.g. using eight hundred logical paths.

As shown in FIG. 3, Logical Volumes 300 are exposed to File Storage Application 200 at least in part by exposing a different subset of the Logical Volumes 300 to File Storage Application 200 over each one of the communication sessions. In the embodiment of FIG. 3, the subsets of Logical Volumes 300 are defined by the Block Storage Application 202, and are referred to as "target groups". Target Group 1 302, consisting of Logical Volume 300(0) through Logical Volume 300(199), is exposed to File Storage Application 200 over iSCSI Session 0 312, and accessed by File Storage Application 200 over iSCSI Session 0 312. Target Group 2 304, consisting of Logical Volume 300(200) through Logical Volume 300(399), is exposed to File Storage Application 200 over iSCSI Session 1 314, and accessed by File Storage Application 200 over iSCSI Session 1 314. Target Group 3 306, consisting of Logical Volume 300(400) through Logical Volume 300(599), is exposed to File Storage Application 200 over iSCSI Session 2 316, and accessed by File Storage Application 200 over iSCSI Session 2 315. And Target Group 4 308, consisting of Logical Volume 300(600) through Logical Volume 300(799), is exposed to File Storage Application 200 over iSCSI Session 3 318, and accessed by File Storage Application 200 over iSCSI Session 3 318.

In order to expose the logical volumes to File Storage Application 200 over the communication sessions established between File Storage Application 200 and Block Storage Application 202 using a total number of logical paths to Logical Volumes 300 that is equal to the total number of the logical volumes provided by Block Storage Application 200 to File Storage Application 200, each individual logical volume in Logical Volumes 300 is exposed to and accessed by File Storage Application 200 using only a single corresponding logical path. For example, each logical volume in the subset of logical volumes Logical Volume 300(0) through Logical Volume 300(199) in Target Group 1 302 is exposed to and accessed by File Storage Application 200 only over iSCSI Session 0 312, using a single corresponding logical path, e.g. a corresponding one of the logical paths/dev/nas_dev0 through/dev/nas_dev199. Each logical volume in the subset of logical volumes Logical Volume 300(200) through Logical Volume 300(399) in Target Group 2 304 is exposed to and accessed by File Storage Application 200 only over iSCSI Session 1 314, using a single corresponding logical path, e.g. a corresponding one of the logical paths/dev/nas_dev200 through/dev/nas_dev399. Each logical volume in the subset of logical volumes Logical Volume 300(400) through Logical Volume 300(599) in Target Group 3 306 is exposed to and accessed by File Storage Application 200 only over iSCSI Session 2 316, using a single corresponding logical path, e.g. a corresponding one of the logical paths/dev/nas_dev400 through/dev/nas_dev599. And each logical volume in the subset of logical volumes Logical Volume 300(600) through Logical Volume 300(799) in Target Group 4 308 is exposed to and accessed by File Storage Application 200 only over iSCSI Session 3 318, using a single corresponding logical path, e.g. a corresponding one of the logical paths/dev/nas_dev600 through/dev/nas_dev799. As a result, the total number of logical paths and associated block devices defined in the operating system (e.g. in Operating System 204 and/or Operating System 220) is equal to the total number of logical volumes provided by Block Storage Application 202 to File Storage Application 200, e.g. eight hundred total logical paths in the example of FIG. 3. This relatively small number of logical paths and corresponding block devices stands in advantageous contrast to the relatively larger numbers of logical paths and block devices that could result when using previous technologies, in which a separate logical path and block device were defined for each logical volume within each individual communication session.

Further in the embodiment shown in FIG. 3, when Block Storage Application 202 receives a connection request, Block Storage Application 202 determines whether the connection request is from File Storage Application 200. For example, Block Storage Application 202 may determine whether the connection request is from File Storage Application 200 by comparing a source IP (Internet Protocol) address in the request to an IP address associated with File Storage Application 200, or by comparing an initiator name in the connection request to a name of iSCSI Initiator 310. In response to detecting that the received connection request is from File Storage Application 200, Block Storage Application 202 exposes only a subset of all logical volumes provided by Block Storage Application 202 to File Storage Application 200 over the communication session established as a result of processing the connection request. For example, Block Storage Application 202 may determine the size of the subsets of the logical volumes exposed over individual communication sessions based on the total number of communication sessions established between File Storage Application 200 and Block Storage Application 202 and the total number of logical volumes provided to File Storage Application 200, such that the number of logical volumes exposed to and accessed by File Storage Application 200 over each one of the communication sessions established between File Storage Application 200 and Block Storage Application 202 is equal to the total number of logical volumes provided by Block Storage Application 202 to File Storage Application 200 divided by the total number of communication sessions established between File Storage Application 200 and Block Storage Application 202. In the example of operation shown in FIG. 3, the total number of logical volumes provided to File Storage Application 200 by Block Storage Application 202 is eight hundred, and the number of communication sessions established between File Storage Application 200 and Block Storage Application 202 is four, resulting in each target group consisting of two hundred logical volumes that are exposed to and accessed by File Storage Application 200 only over a single corresponding one of the communication sessions. In this way, in the embodiment shown in FIG. 3, Block Storage Application 202 may balance the logical volumes provided to File Storage Application 200 across the multiple communication sessions established between File Storage Application 200 and Block Storage Application 202 such that the subsets of the logical volumes exposed to the File Storage Application 202 over the communication sessions each contain an equal number of the logical volumes.

In some embodiments, at the time a new logical volume is created that is provided by Block Storage Application 202 to File Storage Application 200, in response to detecting that the newly created logical volume is a logical volume provided by Block Storage Application 202 to File Storage Application 200, Block Storage Application 202 may determine which one of the communication sessions currently exposes a smallest subset of logical volumes to File Storage Application 200, i.e. which one of the target groups currently contains a fewest number of logical volumes. Block Storage Application 202 may then expose the newly created logical volume to File Storage Application 200 over the communication session currently exposing the smallest subset of logical volumes to the file storage application, e.g. by adding the newly created logical volume to the target group currently containing the fewest number of logical volumes. This is another example of how, in the embodiment of FIG. 3, Block Storage Application 202 may be configured to balance the logical volumes provided to File Storage Application 200 across the communication sessions established between File Storage Application 200 and Block Storage Application 202.

Figure 4:
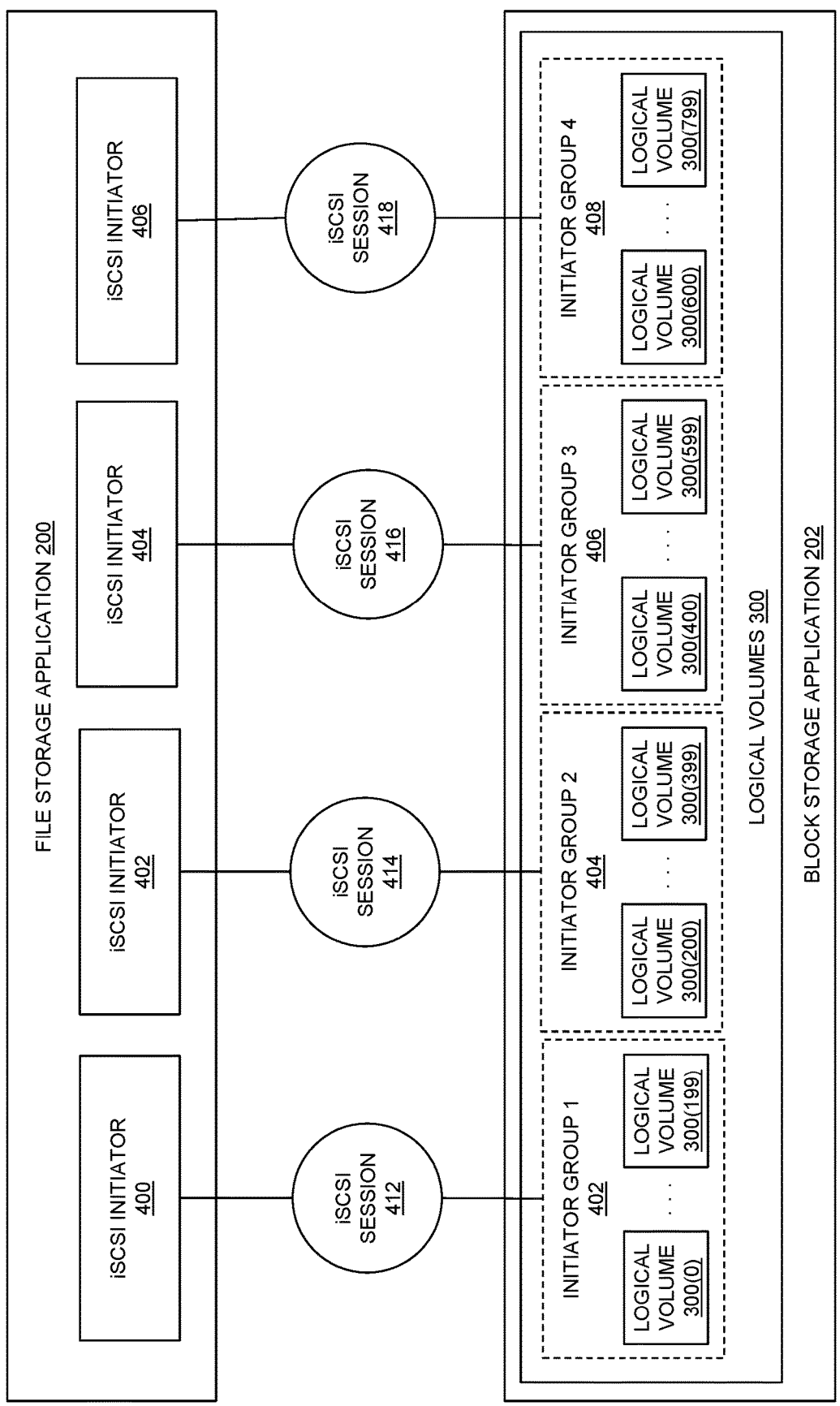
FIG. 4 is a block diagram illustrating an example of the operation of an embodiment of the disclosed technology that includes a file storage application that balances subsets of logical volumes that are exposed to the file storage application across multiple communication sessions established between the file storage application and the block storage application.

FIG. 4 is a block diagram illustrating an example of the operation of an alternative embodiment of the disclosed technology that includes a File Storage Application 200 that balances subsets of Logical Volumes 300 that are exposed to File Storage Application 200 across multiple communication sessions established between File Storage Application 200 and the Block Storage Application 202. In the example of operation of the embodiment shown in FIG. 4, File Storage Application 200 creates four iSCSI initiators, shown by iSCSI Initiator 400, iSCSI Initiator 402, iSCSI Initiator 404, and iSCSI Initiator 406.

Each one of the iSCSI initiators created by File Storage Application 200 connects to Block Storage Application 202 by establishing a corresponding communication session between File Storage Application 200 and Block Storage Application 202. For example, iSCSI Initiator 400 establishes iSCSI Session 412 between File Storage Application 200 and Block Storage Application 202, iSCSI Initiator 402 establishes iSCSI Session 414 between File Storage Application 200 and Block Storage Application 202, iSCSI Initiator 404 establishes iSCSI Session 416 between File Storage Application 200 and Block Storage Application 202, and iSCSI Initiator 406 establishes iSCSI Session 418 between File Storage Application 200 and Block Storage Application 202.

Each one of the iSCSI initiators created by File Storage Application 200 creates and maintains a corresponding initiator group that is a subset of the Logical Volumes 300. In the example of FIG. 4, iSCSI Initiator 400 corresponds to Initiator Group 1 302, consisting of Logical Volume 300(0) through Logical Volume 300(199), iSCSI Initiator 402 corresponds to Initiator Group 2 304, consisting of Logical Volume 300(200) through Logical Volume 300(399), iSCSI Initiator 404 corresponds to Initiator Group 3 306, consisting of Logical Volume 300(400) through Logical Volume 300(599), and iSCSI Initiator 406 corresponds to Initiator Group 4 308, consisting of Logical Volume 300(600) through Logical Volume 300(799).

In the embodiment of the disclosed technology shown in FIG. 4, the features and improvements of the disclosed technology may be provided completely by the file storage application (e.g. by File Storage Application 200). Accordingly, the embodiment of FIG. 4 may advantageously allow the features and improvements of the disclosed technology to be provided without requiring any modification to the block storage application (e.g. without any modification to Block Storage Application 202).

In an example of operation of the alternative embodiment shown in FIG. 4, Block Storage Application 202 provides eight hundred logical volumes to File Storage Application 200, as shown by Logical Volumes 300, which include Logical Volume 300(0) through Logical Volume 300(799). As in the example of operation shown in FIG. 3, Logical Volumes 300 are exposed to File Storage Application 200 over the communication sessions established between File Storage Application 200 and Block Storage Application 202 using a total number of logical paths to Logical Volumes 300 that is equal to the total number of the logical volumes provided by Block Storage Application 200 to File Storage Application 200, e.g. eight hundred.

In the example of operation of the alternative embodiment shown in FIG. 4, Logical Volumes 300 are exposed to File Storage Application 200 by exposing a different subset of the Logical Volumes 300 to File Storage Application 200 over each one of the communication sessions. In the alternative embodiment shown in FIG. 4, the subsets of Logical Volumes 300 are iSCSI initiator groups. Initiator Group 1 402, consisting of Logical Volume 300(0) through Logical Volume 300(199), is exposed to File Storage Application 200 over iSCSI Session 412, and therefore accessed by File Storage Application 200 over iSCSI Session 412. Initiator Group 2 404, consisting of Logical Volume 300(200) through Logical Volume 300(399), is exposed to File Storage Application 200 over iSCSI Session 414, and therefore accessed by File Storage Application 200 over iSCSI Session 414. Initiator Group 3 406, consisting of Logical Volume 300(400) through Logical Volume 300(599), is exposed to File Storage Application 200 over iSCSI Session 416, and therefore accessed by File Storage Application 200 over iSCSI Session 416. And Initiator Group 4 408, consisting of Logical Volume 300(600) through Logical Volume 300(799), is exposed to File Storage Application 200 over iSCSI Session 418, and therefore accessed by File Storage Application 200 over iSCSI Session 418.

FIG. 4 also illustrates an example of how the alternative embodiment of FIG. 4 may expose the logical volumes to File Storage Application 200 over the communication sessions established between File Storage Application 200 and Block Storage Application 202 using a total number of logical paths to Logical Volumes 300 that is equal to the total number of the logical volumes provided by Block Storage Application 200 to File Storage Application 200. As shown in FIG. 4, each individual logical volume in Logical Volumes 300 is exposed to and accessed by File Storage Application 200 through only a single corresponding logical path, through only one of the iSCSI initiators in File Storage Application 200. For example, each logical volume in the subset of logical volumes Logical Volume 300(0) through Logical Volume 300(199) in Initiator Group 1 402 is exposed to and accessed by File Storage Application 200 only over iSCSI Session 412, using a single corresponding logical path, e.g. a corresponding one of the logical paths/dev/nas_dev0 through/dev/nas_dev199. Each logical volume in the subset of logical volumes Logical Volume 300(200) through Logical Volume 300(399) in Initiator Group 2 404 is exposed to and accessed by File Storage Application 200 only over iSCSI Session 414, using a single corresponding logical path, e.g. a corresponding one of the logical paths/dev/nas_dev200 through/dev/nas_dev399. Each logical volume in the subset of logical volumes Logical Volume 300(400) through Logical Volume 300(599) in Initiator Group 3 406 is exposed to and accessed by File Storage Application 200 only over iSCSI Session 416, using a single corresponding logical path, e.g. a corresponding one of the logical paths/dev/nas_dev400 through/dev/nas_dev599. And each logical volume in the subset of logical volumes Logical Volume 300(600) through Logical Volume 300(799) in Initiator Group 4 408 is exposed to and accessed by File Storage Application 200 only over iSCSI Session 418, using a single corresponding logical path, e.g. a corresponding one of the logical paths/dev/nas_dev600 through /dev/nas_dev799. As a result, the total number of logical paths and associated block devices defined in the operating system (e.g. Operating System 204 and/or Operating System 220) is equal to the total number of logical volumes provided by Block Storage Application 202 to File Storage Application 200, e.g. eight hundred in the example of FIG. 4. As with the operation described above with reference to the embodiment shown in FIG. 3, this relatively small number of logical paths and block devices stands in advantageous contrast to the relatively larger numbers of logical paths and block devices that may result using previous technologies, in which a separate logical path and block device are defined for each logical volume within each individual communication session.

In the alternative embodiment of FIG. 4, File Storage Application 200 may determine the size of the subsets of the logical volumes exposed over individual communication sessions based on the total number of communication sessions established between File Storage Application 200 and Block Storage Application 202 and the total number of logical volumes, such that the number of logical volumes exposed to and accessed by File Storage Application 200 over each one of the communication sessions established between File Storage Application 200 and Block Storage Application 202 is equal to the total number of logical volumes provided by Block Storage Application 202 to File Storage Application 200 divided by the total number of communication sessions established between File Storage Application 200 and Block Storage Application 202. In the example of operation shown in FIG. 4, the total number of logical volumes provided to File Storage Application 200 by Block Storage Application 202 is eight hundred, and the number of communication sessions established between File Storage Application 200 and Block Storage Application 202 is four, resulting in each initiator group consisting of two hundred logical volumes that are exposed to and accessed by File Storage Application 200 only over a single corresponding one of the communication sessions. In this way, in the alternative embodiment shown in FIG. 4, File Storage Application 200 may balance the logical volumes provided to File Storage Application 200 across the multiple communication sessions established between File Storage Application 200 and Block Storage Application 202 such that the subsets of the logical volumes exposed to the File Storage Application 202 over the communication sessions each contain an equal number of the logical volumes.

In some embodiments, at the time a new logical volume is created that is provided by Block Storage Application 202 to File Storage Application 200, File Storage Application 200 may determine which one of the communication sessions currently exposes a smallest subset of logical volumes to File Storage Application 200, i.e. which one of the initiator groups contains the fewest logical volumes. File Storage Application 200 may then expose the newly created logical volume to File Storage Application 200 over the communication session currently exposing the smallest subset of logical volumes to the file storage application, e.g. by adding the newly created logical volume to the initiator group containing the fewest logical volumes. This is another example of how, in the alternative embodiment of FIG. 4, File Storage Application 200 may be configured to balance the logical volumes provided to File Storage Application 200 across the communication sessions established between File Storage Application 200 and Block Storage Application 202.

While in the operating examples given above with reference to FIGS. 3-4, the file storage application and block storage application are connected by four communication sessions, and eight hundred logical volumes are provided by the block storage application to the file storage application, these numbers are provided only for purposes of explanation, and those skilled in the art will recognize that the disclosed technology is not limited to operation with these specific values. Those skilled in the art will accordingly recognize that various other specific numbers of communications sessions may be established, and/or that various other specific numbers of logical volumes may be provided, as may be desired under and/or result from various specific operational conditions and/or configurations of the disclosed technology.

Figure 5:
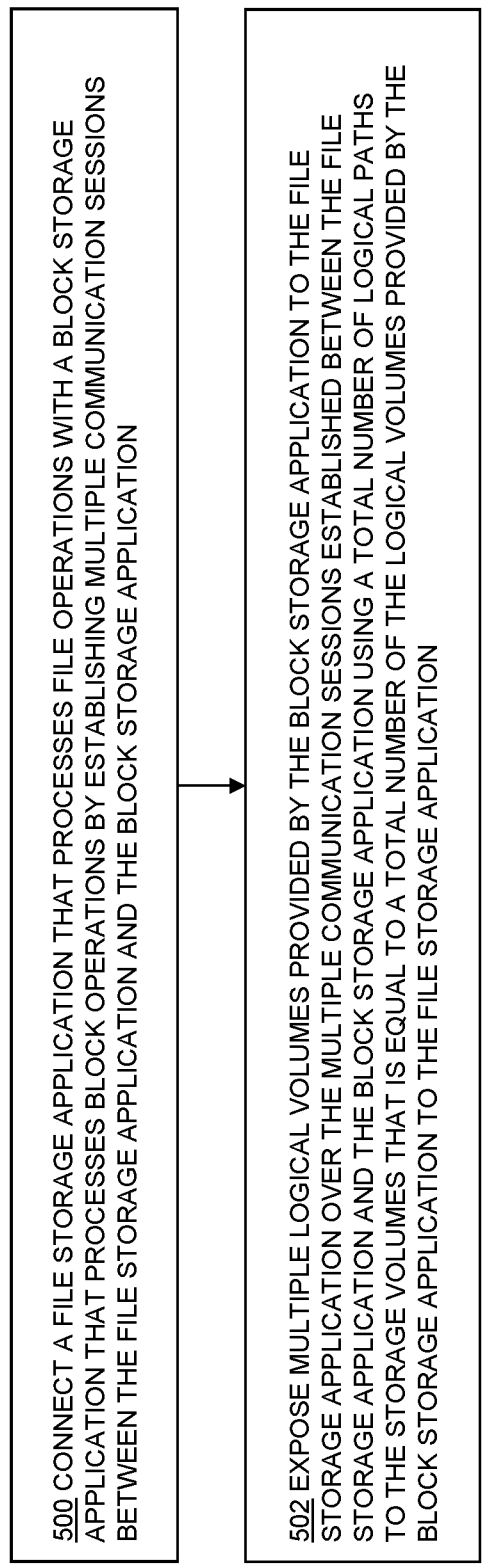
FIG. 5 is a flow chart showing an example of steps that may be performed during operation of some embodiments.

FIG. 5 is a flow chart showing an example of steps that may be performed during operation of some embodiments.

At step 500, a file storage application that processes file operations is connected with a block storage that processes block operations by establishing multiple communication sessions between the file storage application and the block storage application.

At step 502, multiple logical volumes are provided by the block storage application to the file storage application over the multiple communication sessions established between the file storage application and the block storage application using a total number of logical paths to the storage volumes that is equal to a total number of the logical volumes provided by the block storage application to the file storage application.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   connecting a file storage application that processes file operations with a block storage application that processes block operations by establishing multiple iSCSI (Internet Small Computer Systems Interface) communication sessions between the file storage application and the block storage application;
   exposing multiple logical volumes provided by the block storage application to the file storage application over each one of the multiple iSCSI communication sessions established between the file storage application and the block storage application, using a total number of logical paths to the logical volumes exposed over all the iSCSI communication sessions established between the file storage application and the block storage application that is equal to a total number of the logical volumes provided by the block storage application to the file storage application, wherein each logical path corresponds to a block device defined in an operating system, and wherein exposing the logical volumes to the file storage application includes exposing each individual logical volume to the file storage application through a single corresponding one of the logical paths provided by the block storage application to the file storage application; and wherein the file storage application executes in a first node of a data storage system and processes file operations received from client machines, and wherein the block storage application executes in a second node of the data storage system and processes block operations received from the client machines.

2. The method of claim 1, wherein exposing the logical volumes to the file storage application further comprises:
exposing a different subset of the logical volumes to the file storage application over each one of the iSCSI communication sessions.

3. The method of claim 2, further comprising:
balancing the logical volumes across the multiple iSCSI communication sessions between the file storage application and the block storage application such that the subsets of the logical volumes exposed to the file storage application over the iSCSI communication sessions each contain an equal number of logical volumes.

4. The method of claim 3, wherein the number of logical volumes contained in each subset of the logical volumes exposed to the file storage application over one of the iSCSI communication sessions is equal to the total number of logical volumes provided by the block storage application to the file storage application divided by a total number of the iSCSI communication sessions established between the file storage application and the block storage application.

5. The method of claim 2, further comprising:
in response to detecting the creation of a new logical volume provided by the block storage application to the file storage application, exposing the new logical volume to the file storage application over one of the iSCSI communication sessions currently exposing a smallest subset of the logical volumes to the file storage application.

6. The method of claim 3, further comprising:
wherein the subsets of the logical volumes exposed to the file storage application over the iSCSI communication sessions are balanced across the communication sessions by the block storage application.

7. The method of claim 3, further comprising:
wherein the subsets of the logical volumes exposed to the file storage application over the iSCSI communication sessions are balanced across the communication sessions by the file storage application.

8. A data storage system comprising:
at least one node including processing circuitry and a memory; and
wherein the memory has program code stored thereon, wherein the program code, when executed by the processing circuitry, causes the processing circuitry to:
connect a file storage application that processes file operations with a block storage application that processes block operations by establishing multiple iSCSI (Internet Small Computer Systems Interface) communication sessions between the file storage application and the block storage application;
expose multiple logical volumes provided by the block storage application to the file storage application over each one of the multiple iSCSI communication sessions established between the file storage application and the block storage application, using a total number of logical paths to the logical volumes exposed over all the iSCSI communication sessions established between the file storage application and the block storage application that is equal to a total number of the logical volumes provided by the block storage application to the file storage application, wherein each logical path corresponds to a block device defined in an operating system, and wherein the logical volumes are exposed to the file storage application by exposing each individual logical volume to the file storage application through a single corresponding one of the logical paths provided by the block storage application to the file storage application; and
wherein the file storage application executes in a first node of the data storage system and processes file operations received from client machines, and wherein the block storage application executes in a second node of the data storage system and processes block operations received from the client machines.

9. The data storage system of claim 8, wherein the program code, when executed by the processing circuitry, causes the processing circuitry to expose the logical volumes to the file storage application further at least in part by causing the processing circuitry to:
expose a different subset of the logical volumes to the file storage application over each one of the iSCSI communication sessions.

10. The data storage system of claim 9, wherein the program code, when executed by the processing circuitry, further cause the processing circuitry to:
balance the logical volumes across the multiple iSCSI communication sessions between the file storage application and the block storage application such that the subsets of the logical volumes exposed to the file storage application over the iSCSI communication sessions each contain an equal number of logical volumes.

11. The data storage system of claim 10, wherein the number of logical volumes contained in each subset of the logical volumes exposed to the file storage application over one of the iSCSI communication sessions is equal to the total number of logical volumes provided by the block storage application to the file storage application divided by a total number of the communication sessions established between the file storage application and the block storage application.

12. The data storage system of claim 9, wherein the program code, when executed by the processing circuitry, further causes the processing circuitry to:
in response to detecting the creation of a new logical volume provided by the block storage application to the file storage application, expose the new logical volume to the file storage application over one of the iSCSI communication sessions currently exposing a smallest subset of the logical volumes to the file storage application.

13. The data storage system of claim 10, further comprising:
wherein the subsets of the logical volumes exposed to the file storage application over the iSCSI communication sessions are balanced across the communication sessions by the block storage application.

14. The data storage system of claim 10, further comprising:
wherein the subsets of the logical volumes exposed to the file storage application over the iSCSI communication sessions are balanced across the communication sessions by the file storage application.

15. A computer program product including a non-transitory computer readable medium having instructions stored thereon, wherein the instructions, when executed on processing circuitry, cause the processing circuitry to perform the steps of:

connecting a file storage application that processes file operations with a block storage application that processes block operations by establishing multiple iSCSI (Internet Small Computer Systems Interface) communication sessions between the file storage application and the block storage application;

exposing multiple logical volumes provided by the block storage application to the file storage application over each one of the multiple iSCSI communication sessions established between the file storage application and the block storage application, using a total number of logical paths to the logical volumes exposed over all the iSCSI communication sessions established between the file storage application and the block storage application that is equal to a total number of the logical volumes provided by the block storage application to the file storage application, wherein each logical path corresponds to a block device defined in an operating system, and wherein exposing the logical volumes to the file storage application includes exposing each individual logical volume to the file storage application through a single corresponding one of the logical paths provided by the block storage application to the file storage application; and wherein the file storage application executes in a first node of a data storage system and processes file operations received from client machines, and wherein the block storage application executes in a second node of the data storage system and processes block operations received from the client machines.

16. The method of claim 1, wherein the multiple iSCSI communication sessions between the file storage application and the block storage application are established by a single iSCSI initiator in the file storage application.

17. The method of claim 1, wherein the multiple iSCSI communication sessions between the file storage application and the block storage application are established by multiple iSCSI initiators in the file storage application, and wherein each one of the iSCSI communication sessions corresponds to and is established by a single one of the iSCSI initiators.

18. The method of claim 1, wherein the file storage application executes in a first node of a data storage system and the block storage application executes in at least a second node of the data storage system.

* * * * *